United States Patent
Dorward et al.

[11] Patent Number: 6,004,409
[45] Date of Patent: Dec. 21, 1999

[54] PRODUCTION OF HIGH QUALITY MACHINABLE TOLLING PLATE USING BRAZING SHEET SCRAP

[75] Inventors: Ralph C. Dorward, Livermore, Calif.; Greg F. Fitzpatrick, Spokane, Wash.

[73] Assignee: Kaiser Aluminum & Chemical Corporation, Pleasanton, Calif.

[21] Appl. No.: 09/012,010

[22] Filed: Jan. 22, 1998

Related U.S. Application Data

[60] Provisional application No. 60/035,841, Jan. 24, 1997.

[51] Int. Cl.$^6$ ................................................... C22F 1/04
[52] U.S. Cl. ........................... 148/508; 148/549; 148/552
[58] Field of Search .................................... 148/508, 509, 148/552, 549

[56] References Cited

U.S. PATENT DOCUMENTS

| | | | |
|---|---|---|---|
| 2,013,926 | 9/1935 | Pacz | 148/549 |
| 4,235,646 | 11/1980 | Neufeld et al. | 148/549 |
| 5,486,243 | 1/1996 | Hashiguchi et al. | 148/552 |
| 5,503,689 | 4/1996 | Ward et al. | 148/549 |

FOREIGN PATENT DOCUMENTS

| | | |
|---|---|---|
| 1176084 | 10/1984 | Canada . |
| 69026 | 8/1985 | European Pat. Off. . |
| 823445 | 4/1981 | Russian Federation . |
| 1523585 | 11/1989 | Russian Federation . |
| 1786164 | 1/1993 | Russian Federation . |

OTHER PUBLICATIONS

Metallurgiya, vol. 16, Dec. 1982, Collection of Papers: A Study in the Effect of Secondary Silumins on the Properties of AL4 Alloy, 71–73, Galushko et al., —Russia.

Khim. Neft. Mashinostr., vol. 8, Dec. 1981, Production of Compressor Castings from Secondary Aluminum Alloy AK9 (AL4V), 33–34, Kodinov et al., —Russia.

*Primary Examiner*—Scott Kastler
*Attorney, Agent, or Firm*—Jones, Tullar & Cooper

[57] ABSTRACT

The present invention is a process to use aluminum alloy scrap to manufacture high quality machinable tooling plate. This is an new use for this scrap which has heretofore been used in lower quality products. The tooling plate thus made has superior properties when machined as it produces smaller chips and/or a limited of spirals from the plate. Large chips and long spirals create problems and a smaller chip greatly facilitates the machining operation.

12 Claims, No Drawings

PRODUCTION OF HIGH QUALITY MACHINABLE TOLLING PLATE USING BRAZING SHEET SCRAP

The present application derives priority from provisional application no. 60/035,841, filed Jan. 24, 1997 which is hereby incorporated by reference in its entirety.

FIELD OF THE INVENTION

The present invention relates to the production of aluminum alloy. More specifically, the present invention relates to a method for producing an aluminum alloy plate for use in machine tooling operations and a method for producing the plate using other alloys as a feedstock.

BACKGROUND OF THE INVENTION The market for aluminum in automotive heat exchangers has increased dramatically over the past 10 years. These sheet products incorporate a high silicon alloy cladding on an aluminum-manganese 3005-type alloy core; and as such constitute a problem in scrap disposition.

One solution towards the utilization of this material is to make building products, such as gutter sheet, of the above composition. However, these products are low value added. It would be desirable therefore if the scrap could be upgraded to a more profitable. One such product is "tooling" plate, widely used in many industrial applications, including complex components produced by various machining operations (turning, drilling, milling, etc.). The commonly-used tooling plate in the U.S. is alloy 6061 (nominally Al—0.6%Si—1.0%Mg—0.25%Cu—0.2%Cr), which might be a viable candidate, but for its 0.15% maximum limit on manganese. Other possibilities are 6066-type alloys that have relatively high levels of both manganese and silicon, e.g.

| Alloy | Nominal % by wt. | | | | |
|---|---|---|---|---|---|
| | Si | Fe[a] | Cu | Mn | Mg |
| 6013 | 0.8 | 0.5 | 0.9 | 0.5 | 1.0 |
| 6066 | 1.4 | 0.5 | 1.0 | 0.9 | 1.1 |
| 6070 | 1.4 | 0.5 | 0.3 | 0.7 | 0.9 |

[a]maximum

Accordingly, there is a need for a process to manufacture machinable tooling plate using lower cost feedstocks, such as brazing sheet scrap. Also, there is a need to provide a process to utilize the excess brazing scrap that is produced during the manufacture of this product. Additionally, there is always a need for machinable tooling plate that has superior machining properties.

SUMMARY OF THE INVENTION

The present invention is a process for the use of aluminum scrap in the production of aluminum machinable tooling plate. It comprises obtaining scrap, melting the scrap, analyzing the melted aluminum alloy and, if necessary, adding elements to the melt to ensure that they all fall within the following ranges (wt. %) Si 0.8–1.5; Cu 0.2–1.0; Mg 0.8–1.2; Mn 0.5–1.2; Fe≦0.5; Ti≦0.15; and casting the machinable tooling plate; wherein the machinable tooling plate produces small chips, having an chip rating of between 1 and 3, when machined. Preferably, this scrap is brazing sheet scrap. Also, a new machinable tooling alloy has been discovered which has the superior tooling chip property noted above.

Among other factors, it has been discovered that a new use has been found for scrap aluminum alloy, preferably brazing sheet scrap. As scrap, the brazing alloy has very little utility. However, with the new use described herein, the brazing scrap can be used as a feedstock for the manufacture of alloys that are considerably more economically desirable. Furthermore, the machinable tooling plate made by the present invention is superior to many conventional tooling plates. When machined, it produces chips having a size rating of between 1 and 3, preferably 1. These chips are produced when the tooling plate is machined to produce the finished product and it is highly desirable to produce chips that are small due to the detrimental effects of larger chips on the machines and the operators who run them. Consequently, the present process makes a high quality product from a low grade feedstock and the product is advantageous over other alloys due to its smaller chip size, when machined.

Specifically, the present invention is a process for the use of aluminum brazing sheet scrap in the production of aluminum machinable tooling plate, comprising: obtaining brazing scrap having at least the following elements in the following approximate concentrations (±0.1 wt %): Si 0.7–2.0; Cu 0.2–0.55; Mg 0.0–05; Mn 0.8–1.1; Fe 0.25–0.40; and Zn 0.0–0.25; and the balance is aluminum; melting the brazing scrap by heating to 1250°–1400° F.; analyzing the approximate weight % of the above constituents and, if necessary, adding the elements to the melt to ensure that they all within the following approximate concentrations (±0.05 wt %): Si 1.3; Cu 0.3–0.8; Mg 1.0; Mn 1.0; Fe≦0.25; and casting the machinable tooling plate alloy to ingot suitable for hot rolling, scalping approximately 0.25 inches per surface of the ingot, hot rolling the alloy at a 600° F. minimum temperature to form a plate at least 0.25 inches thick, solution heat treating the plate at between 950 and 1050° F. for 30 minutes, quenching the plate to room temperature, stretching the plate by about 2%, and ageing the alloy at between 300° F. and 400° F. for between 2 and 20 hours; wherein the machinable tooling plate produces chips, having a chip rating of 1, when machined.

DETAILED DESCRIPTION OF THE INVENTION

The following process is employed to achieve the use of scrap alloys, such as brazing sheet scrap, in the manufacture of high quality machinable tooling plate. Also described below is a high quality machinable tooling plate.

Preferred scrap aluminum alloy that can be used in the present process contains the following elements in the following ranges for brazing sheet scrap and can body stock:

| Element | Wt % |
|---|---|
| Si | 0.2–2.0 |
| Cu | 0.2–0.55 |
| Mg | 0.2–1.2 |
| Mn | 0.8–1.2 |
| Fe | 0.2–0.4 |
| Zn | ≦0.1 |
| Ti | 0.01–0.05 |

Aluminum scrap includes alloys designated by the 3000 series, such as 3003 or 3004 (including can body stock), or 6000 series alloys. Preferably, the scrap aluminum is predominantly brazing sheet scrap. Predominantly is defined as at least more than 40%, more preferably, more than 60%, most preferably more than 80%. The brazing sheet typically consists of a cladding diffusion bonded to a core alloy. Typically, the brazing alloy contains a core and cladding (also known as filler). The cladding can contain 10% silicon and make up 10% of the thickness of the brazing alloy. This cladding may be present on one or both sides of the core. If it is on one side only, then a different cladding may be present on the other, or there may be none at all. The cladding/core composite alloy results in the following typical composition:

| Element | % by wt. Range | Ave. by Vol. |
| --- | --- | --- |
| Silicon | 0.7–2.0 | 1.3 |
| Iron | 0.25–0.4 | 0.25 |
| Copper | 0.2–0.55 | 0.3 |
| Manganese | 0.8–1.1 | 0.95 |
| Magnesium | 0.0–0.5 | 0.35 |
| Zinc | 0.0–0.2 | 0.05 |

The ranges above relate to the components in the individual alloy and the average of the alloys by volume. Examples of brazing alloy are shown in the following U.S. Pat. Nos. which are hereby incorporated by reference in their entireties: 5,422,191; 5,535,939; 5,520,321; 5,564,619; and 4,173,302.

A typical recycling sequence is as follows: melt scrap (1250°–1400° F.); analyze; cast to ingot; homogenize ingot (950°–1050° F.); hot roll to plate; optionally anneal and cold roll; and solution heat treat (970°–1040° F.).

The scrap may be added in molten form to the furnace or it may be melted in an induction furnace. The induction furnace induces a turbulence or movement of the molten aluminum. One suitable form of channel-type induction furnace is described in U.S. Pat. Nos. 3,092,682 and 3,595,979 which are hereby incorporated by reference in their entireties. However, the channel-type induction firnace exerts very little stirring of the molten metal in the surface region and is therefore ineffective to submerge low density decoated aluminum scrap in the molten metal in the furnace at a rate comparable to the rate at which it can supply heat for melting the scrap. U.S. Pat. No. 4,571,258 seeks to obviate the problem of aluminum oxidation of low density scrap in a continuous feeding operation. It is also hereby incorporated by reference in its entirety.

Before charging and melting the scrap, it should be cleaned of any residual oils and lubricants and even degreased if necessary. Further, the scrap should be dried before melting so as to remove water. The steps in cleaning scrap are: clean and degrease, dry, melt, add fluoride values, remove skim, and process skim, if desired. If a water/detergent cleaning agent is used, the scrap should be dried before charging into the induction melter. If a solvent, such as hexane, is used, drying may not be required. Also, most lubricating oils start to boil at about 400° F., and at temperatures over 500° F., the oxidation of high surface area scraps will significantly lower metal recovery. The scrap is typically melted using techniques known in the art and analyzed for its elemental content using a spectrographic device such as a Quantometer. See U.S. Pat. Nos. 5,032,171, 4,983,216, and the patents cited above for scrap melting devices and conditions. These patents are hereby incorporated by reference in their entireties.

If the elements (i.e. copper, silicon, iron, magnesium, manganese, etc.) are not present in the appropriate amounts, then they can be added using the desired element itself or aluminum scrap that contains higher amounts of the element. For example, the 2000 series alloys are high in copper and the alloys used to make the lids in aluminum can is high in magnesium content. These alloys can be added to the melt if more copper or magnesium are necessary. Alternatively, if the concentration of an element is too high pure, aluminum can be added to the melt to dilute the element. Thereafter, the alloy is prepared by casting to ingot, hot working the stock; solution heat treating; and cooling.

Optionally, before the hot working step, the ingot is homogenized to produce a substantially uniform distribution of alloying elements. This step is typically performed by heating to a temperature ranging from about 900 to 1050° F. for a period of at least 1.0 hour to dissolve soluble elements and to homogenize the internal structure of the metal. However, temperatures above 1060° F. are likely to damage the metal due to localized melting and thus these increased temperatures are avoided, if possible. Generally, the stock is homogenized for at least 4.0 hours in the homogenization temperature range. Most preferably, it is homogenized for about 6.0 to 20.0 hours at about 1000° F.

For hot working, the stock is preferably heated to a temperature ranging from about 700 to 950° F. for about 1.0 to 20.0 hours. Most preferably, the stock is heated to a temperature ranging from about 800 to 900° F. for about 1.0 to 2.0 hours. Preferably, hot rolling is performed at a starting temperature ranging from about 750 to 900° F., or even higher, as long as no melting or other ingot damage occurs.

After hot rolling, the stock can be annealed. Preferably, this anneal is conducted at a temperature ranging from about 725 to 875° F. for about 1.0 to 12.0 hours. Most preferably, the stock is annealed at a temperature ranging from about 750 to 850° F. for about 4.0 to 6.0 hours at heating rate ranging from about 25 to 100° F. per hour, with the optimum being about 50° F. per hour.

Depending on the final thickness of the product, the intermediate gage stock can be cold rolled. Preferably, the annealed stock is cooled to less than 100° F. and most preferably to room temperature before cold rolling. Preferably, the cold roll reduces the thickness to at least 60% of the starting stock, most preferably to a thickness ranging from about 40 to 60% of the hot rolled gage.

After hot and/or cold rolling, the stock is solution heat treated at a temperature of between 950 and 1050° F. Preferably, it is solution heat treated at a temperature ranging from about 1000 to about 1050° F. for about 10 to 30 minutes. It is important to rapidly heat the stock, preferably at a heating rate of about 100 to 200° F. per minute. Most preferably, the stock is solution heat treated at about 1020 to 1040° F. for about 15 minutes at a heating rate of about 100° F. per minute.

If the temperature is substantially below 1000° F., then the soluble elements, copper and magnesium are not taken into solid solution. Similarly, if the time at the solution heat treatment temperature is too short, these intermetallic compounds do not have time to dissolve. The heating rate to the solutionizing temperature is important because relatively fast rates generate a fine grain (crystallite) size, which is desirable for good ductility and high strength.

After solution heat treatment, the stock is rapidly cooled to minimize uncontrolled precipitation of secondary phases, such as $Mg_2Si$ and $Al_2Cu$. Preferably, it is quenched at a rate of at least 20° F./sec. over the temperature range 750 to 550° F. from the solution temperature to a temperature of 100° F. or lower. Most preferably, it is quenched using a high pressure water spray at room temperature or by immersion into a water bath at room temperature, generally ranging from about 60 to 80° F. Thereafter, subsequent processing steps may be included such as stress relieving by stretching the plate by between 1 and 4%, preferably about 2%. The plates are then artificially aged at temperatures between 300 and 400° F. for times ranging from 2 to 20 hours.

The tooling plate of the present invention has superior properties when it is machined. It is "free machining", i.e., it produces few large machine turnings, called chips and/or spirals. Large chips and spirals are undesirable because they interfere with the machine tooling and the operator, and create a handling problem. Consequently, it is more advantageous to produce small chips to avoid the above problems and to ensure ease of disposal. As stated above, the present tooling plate produces smaller turnings when machined. These turnings can be measured using standards, such as those shown in FIGS. 1a–e. FIG. 1a shows a rating of 1 and is limited to chips generally no greater than 0.25 inch long with no spirals; FIG 1b shows a rating of 2 and is limited to chips generally up to ⅜ inch with fewer than 10% spirals, FIG. 1c shows a rating of 3 and is limited to chips generally up to ½ inch with up to 20% spirals, FIG. 1d shows a chip size of 4, and is limited to chips generally up to ⅝ inch with up to 40% spirals; and FIG. 1e shows a rating of 5 and is limited to chips up to ¾ inch with up to 50% spirals. Rating 1 is considered excellent, 5 unacceptable, and 3 acceptable.

A preferred tooling plate product has the following composition given in weight percent (wt %). The upper limit of silicon is preferably, no more than 1.5 wt. % Si, more preferably no more than 1.4. The lower limit on silicon is preferably at least 0.6. Most preferably the wt. % is 1.3. The upper limit of copper is preferably, no more than 1.0 wt. %, more preferably no more than 0.8. The lower limit of copper is preferably 0.2. Most preferably the wt % is 0.3. The upper limit of manganese is preferably, no more than 1.4 wt. %, more preferably no more than 1.1. The lower limit is preferably 0.7. Most preferably the wt % is 0.9. The upper limit of magnesium is preferably, no more than 1.2 wt. %. The lower limit of magnesium is preferably 0.6, more preferably it is 0.8. Most preferably the wt % is 1.0. Titanium is preferably less than 0.15, iron is preferably less than 0.5, zinc is preferably less than 0.25 wt %. The most preferred concentrations may vary ±0.10 wt. %.

EXAMPLE

To determine the tensile properties and machinability characteristics of this alloy system, ingots of the following composition were cast:

| | % by wt. (ICP) | | | | | |
|---|---|---|---|---|---|---|
| Alloy | Si | Fe | Cu | Mn | Mg | Ti |
| A | 1.35 | 0.26 | 0.84 | 0.92 | 0.96 | 0.03 |
| B | 1.34 | 0.27 | 0.27 | 0.93 | 0.96 | 0.02 |

The only difference between the two alloys, as prepared, is copper (0.27 vs. 0.84%), which for A would have to be added to the scrap charge. We note that some magnesium would also have to be added to both alloys if brazing sheet scrap was utilized for the alloy charge. The ingots were homogenized at 1000° F. for 16 hr using 50° F./hr heating and cooling rates. After scalping 0.25" per surface, they were hot rolled to 0.5" plate, maintaining a 600F. minimum temperature. The plates were solution heat-treated at 1020° F. for 30 min., quenched in room temperature water, and stretched 2%. Samples were then aged at 350° F. for 5, 8, 12 and 16 hr (50° F./hr heating rate). Transverse tensile properties were measured, and a machinability assessment of chip size was made while turning the tensile blanks into round specimens. The tensile properties are shown as aging curves in FIGS. 2 and 3. For Alloy A, the yield strength was about 53 ksi, independent of aging time, whereas ultimate strength and elongation decreased somewhat with time. The strength of Alloy B peaked at about 8 hr (53 ksi), decreasing to 50 ksi (YS) and 54 ksi (UTS) after 1 hr. Alloy B elongations were lower than those for Alloy A by about 2% for a given aging treatment. The yield-ultimate spread was also significantly greater for Alloy A; this difference and the higher elongation are probably due to its relatively high copper level, which would be a disadvantage if corrosion resistance is important.

Machinability was characterized by the chip size obtained when round specimens were prepared for tensile property measurements. For ease of handling, machine shop operators desire turnings comprised of small, discrete chips rather than long continuous spirals. Square section samples were first turned to round sections before running the trials. The material was turned in a lathe operating at 1300 rpm using two rough cuts 0.05 inches deep at a feed rate of 0.0042 in./revolution with a new carbide tool and an oil in water emulsion as a coolant. In the absence of an industry standard for describing chip size, an internal scale of 1 to 5 was used. A top rating of 1 required discrete chips no greater than 0.25 inches in size. Based on a rating scale of 1 to 5 (see FIGS. 1a–d), both alloys machined very well: a chip size rating of "1" for all aging conditions compared to a rating of "3" for 6061-T6 plate.

The present invention has been described with reference to specific embodiments. However, this application is intended to cover those changes and substitutions which may be made by those skilled in the art without departing from the spirit and the scope of the appended claims.

We claim:

1. A process for the use of aluminum scrap in the production of aluminum machinable tooling plate, comprising:

A) obtaining aluminum scrap on average having at least the following elements in the following concentrations:

| Element | Wt % |
|---|---|
| Si | 0.2–2.0 |
| Cu | 0.2–0.55 |
| Mg | 0.2–1.2 |
| Mn | 0.8–1.2 |
| Fe | 0.2–0.4 |
| Zn | ≦0.1 |
| Ti | 0.01–0.05 | and the balance is aluminum;

B) melting the scrap;

C) analyzing the approximate weight % of the above constituents and, if necessary, adding elements to the melt to ensure that the melt contains elements within the following ranges:

| Element | Wt % |
|---|---|
| Si | 0.6–1.5 |
| Cu | 0.2–1.0 |
| Mg | 0.6–1.2 |

-continued

| Element | Wt % |
| --- | --- |
| Mn | 0.7–1.2 |
| Fe | ≦0.5 |
| Ti | ≦0.15 |
| Zn | ≦0.25 | and the balance is aluminum

D) and casting machinable tooling plate;

wherein the machinable tooling plate produces chips, having an chip rating of between 1 and 3, when machined.

2. A process in accordance with claim 1 wherein the scrap is predominantly brazing scrap having the following elements in the following concentrations ±0.1 wt %:

| Element | Wt % |
| --- | --- |
| Si | 0.7–2.0 |
| Cu | 0.2–0.55 |
| Mg | ≦0.5 |
| Mn | 0.8–1.1 |
| Fe | 0.25–0.4 |
| Zn | ≦0.2 |

3. A process in accordance with claim 1 wherein the machinable tooling plate has the following elements in the following concentrations ±0.1 wt %:

| Element | Wt % |
| --- | --- |
| Si | 0.6–1.4 |
| Cu | 0.2–0.8 |
| Mg | 0.8–1.2 |
| Mn | 0.7–1.1 |
| Fe | ≦0.5 |
| Ti | ≦0.15 |
| Zn | ≦0.25 |

4. A process in accordance with claim 1 wherein the machinable tooling plate has the following elements in the following concentrations ±0.1 wt %:

| Element | Wt % |
| --- | --- |
| Si | 0.6–1.3 |
| Cu | 0.2–0.8 |
| Mg | 0.8–1.0 |
| Mn | 0.7–0.9 |
| Fe | ≦0.5 |
| Ti | ≦0.15 |
| Zn | ≦0.25 |

5. A process in accordance with claim 1 wherein the machinable tooling plate has the following elements in the following concentrations ±0.1 wt %: silicon- 1.3 wt. %, copper-0.3 to 0.8 wt. %, manganese-0.9 wt. %, magnesium- 1.0 wt. %, iron- no more than 0.5 wt. %. titanium- no more than 0.15 wt. %, and zinc- no more than 0.25 wt. %.

6. A process for the use of aluminum brazing scrap in the production of aluminum machinable tooling plate, comprising:

A) obtaining brazing scrap on average having at least the following elements in the following approximate concentrations (±0.1 wt %):

| Element | Wt % |
| --- | --- |
| Si | 0.7–2.0 |
| Cu | 0.2–0.55 |
| Mg | 0.0–0.5 |
| Mn | 0.8–1.1 |
| Fe | 0.25–0.4 |
| Zn | ≦0.25 | and the balance is aluminum;

B) heating the brazing scrap to between 1250 and 1400° F.;

C) analyzing the approximate weight % of the above constituents and, if necessary, adding elements to the melt to ensure that they are within the following approximate concentrations (±0.10 wt %):

| Element | Wt % |
| --- | --- |
| Si | 1.3 |
| Cu | 0.3–0.8 |
| Mg | 1.0 |
| Mn | 1.0 |
| Fe | 0.25 |

D) and casting the machinable tooling plate alloy to form rolling ingot, scalping approximately 0.25 inches per surface of the alloy described in paragraph C, hot rolling the alloy at a 600° F. minimum temperature to form a plate at least 0.25 inches thick, solution heat treating the plate at between 1020 to 1040° F. for 30 minutes, quenching the plate to room temperature, stretching the plate by about 2%, and ageing the alloy at between 300° F. and 400° F. for between 2 and 20 hours;

wherein the machinable tooling plate produces chips, having a chip rating of 1, when machined.

7. A product made in accordance with the process of claim 1.

8. A product made in accordance with the process of claim 2.

9. A product made in accordance with the process of claim 3.

10. A product made in accordance with the process of claim 4.

11. A product made in accordance with the process of claim 5.

12. A product made in accordance with the process of claim 6.

* * * * *